Figure 1:
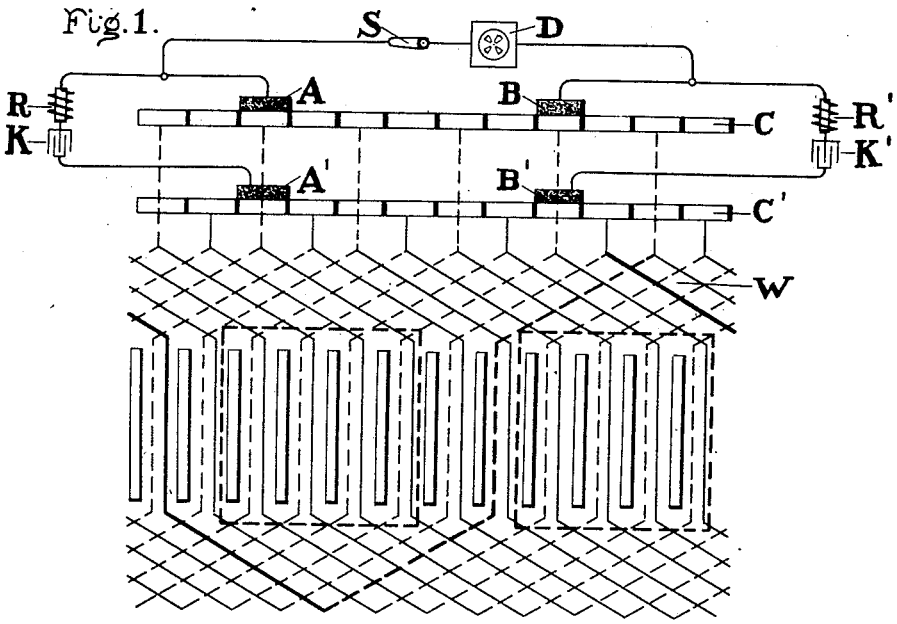

No. 781,035. PATENTED JAN. 31, 1905.
E. THOMSON.
COMMUTATION OF ELECTRIC CURRENTS.
APPLICATION FILED SEPT. 17, 1903.

Witnesses:

Inventor:
Elihu Thomson.
by Albert B. Davis
Att'y.

No. 781,035. Patented January 31, 1905.

UNITED STATES PATENT OFFICE.

ELIHU THOMSON, OF SWAMPSCOTT, MASSACHUSETTS, ASSIGNOR TO GENERAL ELECTRIC COMPANY, A CORPORATION OF NEW YORK.

COMMUTATION OF ELECTRIC CURRENTS.

SPECIFICATION forming part of Letters Patent No. 781,035, dated January 31, 1905.

Application filed September 17, 1903. Serial No. 173,508.

*To all whom it may concern:*

Be it known that I, ELIHU THOMSON, a citizen of the United States, residing at Swampscott, county of Essex, State of Massachusetts, have invented certain new and useful Improvements in Commutation of Electric Currents, of which the following is a specification.

My invention relates to the commutation of electric currents, and has for its object the provision of means for preventing unduly large currents from flowing in those conductors the circuits of which are locally closed by the brushes which bear upon the commutator. In its broad aspect the commutator and brushes may be considered simply as a means for connecting a plurality of conductors together and to a circuit-terminal and are not limited in their application to the winding of a dynamo-electric machine.

More specifically stated, my invention relates to the commutation of the secondary currents in a repulsion-motor; and it consists of an improved arrangement calculated to prevent the flow of unduly large currents in the coils undergoing commutation.

In repulsion-motors as ordinarily constructed each commutator-brush bridges two or more segments of the commutator, and thereby short-circuits one or more of the secondary or armature coils. Such short-circuited coils act as short-circuited secondaries with relation to the primary or field-winding of the motor, and therefore extremely large currents are caused to flow therein. The effect of this is to overheat the coils, impair the efficiency of the machine, and cause sparking. In the operation of a repulsion-motor it is of course essential that the external circuit of the armature shall not be broken at the brushes, and therefore it is necessary that before one segment passes out of contact with a brush the succeeding segment shall come into contact. Thus the circuit of a coil is locally closed. According to my invention I prevent too great a current from flowing in the coils undergoing commutation by inserting a current-limiting means in the locally-closed circuit. This I accomplish by providing a commutator comprising two ranges of segments with brushes arranged in pairs on both ranges of segments and inserting the current-limiting means between the brushes of a pair, as will be hereinafter described. This means for inserting the current-limiting device is new, so far as I am aware, regardless of the nature of the device which is employed. The condenser is, however, of peculiar value as a current-limiting device in this connection on account of its high efficiency and the fact that it may be chosen of such capacity that it will act as a bar to the passage of current of low voltage, but will readily pass currents of higher voltage. As far as I am aware, the use of a condenser in this connection is broadly new regardless of the means employed for connecting it in circuit. The condenser may at certain times be required to pass the working current. It should therefore be chosen of such capacity that it will readily pass that current, such current being of comparatively high voltage, but will act as a practical insulator to the low-voltage current of the coil whose circuit is locally closed. The condenser may have an undesirable dephasing effect upon the current, and I therefore provide means for correcting such action. This may be done by inserting a reactance in series with the condenser.

My invention is particularly valuable in connection with repulsion-motors, but it may have other applications. I will now describe it in connection with the accompanying drawings, and what I consider new and of my invention will be pointed out in the appended claims.

Figure 2:
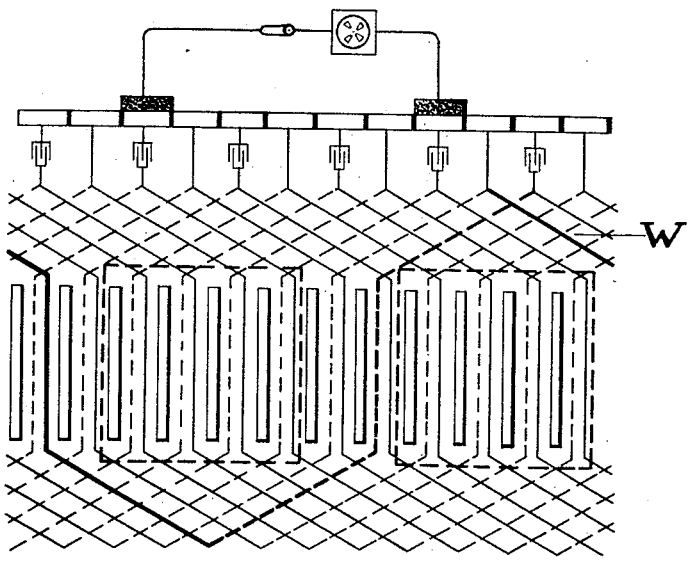

Figure 1 is a diagram showing the development of the secondary or armature of a bipolar repulsion-motor with my invention applied thereto, and Fig. 2 is a similar development showing a modification.

Referring to Fig. 1, the winding W has connected to it a commutator comprising two ranges of commutator-segments C and C', each of said ranges being composed of alternate active or live and idle or dead segments, the active segments being those which are connected to the winding, the dead segments being unconnected. These dead segments will usually be of the same construction and material as the live segments, but if for any reason it is thought desirable they might be constructed of insulating material. Bearing upon the ranges of segments are the pairs of brushes A A' and B B', each pair of brushes taking the place of a single brush in the usual construction. These brushes may be of carbon or other suitable material and of a width not greater than that of one of the idle or dead segments, so that a brush will not connect two live segments. Connected between each pair of the brushes is a condenser and a reactance in series, as the condenser K and reactance R between the brushes A and A' and the condenser K' and reactance R' between the brushes B and B'. One of each pair of brushes, as A and B, is connected to a terminal of the external circuit by means of which the armature-winding is short-circuited through the brushes, and in this circuit may be placed a switch, as S, and a regulating means D, which may be a rheostat or other suitable device. Alternate leads from the armature-winding are connected to adjacent live segments in one range, the remaining leads being similarly connected to the other range of segments. The brushes of a pair are arranged in line and a dead segment of one range lies opposite a live segment in the other; but, if desired, the live segments might be arranged opposite each other, in which case the brushes would be staggered. The course of one coil of the winding W about the armature is indicated by the heavy line and is typical of all the coils of the winding. The area upon the armature which is covered by the poles of the primary member is indicated by the dotted squares superposed on the development of the winding. The primary member and winding are not shown, as their construction is well understood. They may be such as to form poles fixed in position, as in the field members of the continuous-current machines as ordinarily constructed, or the primary members may be toothed and the winding be of the distributed-drum type, as is common in the construction of induction-motors, and other forms will be suggested to those skilled in the art.

I will now describe the operation of my invention in connection with the machine illustrated.

In the position shown the brushes A and B rest upon active segments of the range C, while the brushes A' and B' rest upon dead segments of the range C'. Circuit of the winding is therefore closed through the brushes A and B to the external circuit, thereby short-circuiting the armature. In this position the branches containing the condensers are open-circuited. As the armature revolves the brushes A and B will gradually move off the live segments and upon the dead ones, while the brushes A' and B' will move off the dead segments and upon lives ones. A sufficient movement of the armature will finally bring the brushes A and B wholly upon dead segments of the range C and the brushes A' and B' wholly upon live segments of the range C'. In the intermediate positions between the one last described and that shown in Fig. 1 the brushes of a pair, as A and A', will each be in contact with a live segment of its corresponding range, and thus the circuit of a coil will be locally closed through those brushes, the reactance R, and the condenser K, as may readily be traced. The condenser K, however, is of such capacity that it acts as a practical insulation to the low-voltage current generated in the coil. In like manner circuit of another coil will be locally closed through brushes B and B', condenser K', and reactance R'. In addition to the local circuits just described the circuit of the armature will be closed through the brushes and the external circuit, current flowing through one pair of brushes, the external circuit, and the other pair of brushes. The current under the circumstances where each brush of a pair is in contact with an active segment is principally carried by the brushes A and B, since they short-circuit the branches containing the condensers. When the brushes A' and B' lie wholly upon live segments the circuit through the brushes A and B will be broken. Hence there will be no locally-closed coil and the armature will be connected to the working circuit through the brushes A' and B', the condensers K and K', and reactances R and R'. As the voltage of half of the armature-coils in series is now impressed upon the external circuit, and therefore upon the condensers, said condensers will allow the comparatively free passage of this working current. Further movement of the armature operates to shift the brushes A and B to live segments again and the brushes A' and B' to dead segments, the various brushes engaging alternately with the dead and live segments in such manner as to maintain the external circuit of the armature continually closed and to interpose the condenser and reactance in series in the circuits of these coils which have their circuits locally closed. The reactances are interposed in series with the condensers in order to correct any injurious dephasing effect which may be caused by the condensers. It may be, however, that the dephasing effect of the condensers will not be considered serious enough to require a remedy, and in such cases reactances may be omitted, the condenser only being inserted in circuit between the brushes of a pair. While I have chosen a bipolar motor to illustrate the application of my invention, it will be understood that it might readily be extended, so as to be applied to a machine having any other number of poles.

In Fig. 2 I have shown a modification in which but one range of commutator-segments is employed, all of which are connected to the armature-winding, and one brush takes the place of a pair in Fig. 1. The insertion of the condenser in the locally-closed circuits of the armature is accomplished by placing condensers in alternate commutator-leads. The brushes bearing upon the commutator are of a width not greater than that of one segment, and the external circuit of the armature is closed in the usual manner by connecting the terminals of that circuit to the brushes. In the position as shown each brush lies wholly upon one segment, and therefore none of the coils of the armature are locally closed, and the brushes are shown as bearing upon those segments which are connected to the winding through condensers. In this position, therefore, the condensers are required to pass the working current and are chosen of a capacity as described in connection with Fig. 1. If desired, a reactance might be included in the commutator-leads in series with the condensers for correcting any injurious dephasing effect. Movement of the armature causes each of the brushes to be brought into simultaneous contact with adjacent commutator-segments—that is, with one connected to the winding through a condenser and with one connected directly to the winding. It is therefore obvious that a coil of the armature will have its circuit locally closed by each of the brushes, but that they will be closed through condensers which constitute a practical bar to the passage of the low-voltage currents which tend to flow in those coils. Further movement of the armature will eventually cause the brushes to lie wholly upon segments connected directly to the armature-winding, when the condensers will be out of circuit. Further movement operates to again bring the brushes in contact with segments connected to the winding through condensers and those which are connected to the winding directly. Thus a condenser is always inserted in the circuit of coils which have their circuits locally closed, and the connection of the external circuit is continuously maintained. The arrangement shown in Fig. 2 therefore will accomplish the same object as that shown in Fig. 1, but has the disadvantage of requiring a larger number of condensers and reactances, (if reactances are used,) as well as complicating the armature construction. The construction shown in Fig. 1 is therefore to be preferred.

In accordance with the patent statutes I have described the principle of operation of my invention, together with the apparatus which I now consider to represent the best embodiment thereof; but I desire to have it understood that the apparatus shown in the drawings is only illustrative and that the invention may be carried out by other means than the specific embodiment which I have shown.

What I claim as new, and desire to secure by Letters Patent of the United States, is—

1. The combination of a commutator, conductors connected to said commutator, a condenser, a circuit-terminal, and means for connecting a plurality of said conductors to said circuit-terminal and inserting a condenser between the conductors so connected.

2. The combination of a commutator, conductors connected to said commutator, a condenser, a phase-correcting device, a circuit-terminal, and means for connecting a plurality of said conductors to said circuit-terminal and inserting a condenser and phase-correcting device between the conductors so connected.

3. The combination of a commutator, a winding connected thereto, brushes bearing thereon, and condensers inserted in the circuits of those portions of said winding, the circuits of which are locally closed by said brushes.

4. The combination of a commutator, a winding connected thereto, brushes bearing thereon, and a condenser and phase-correcting device inserted in the circuits of those portions of said winding, the circuits of which are locally closed by said brushes.

5. The combination of a winding, a commutator comprising two ranges of segments connected thereto, pairs of brushes, each pair bearing on both of said ranges, and current-limiting means connecting the brushes of a pair.

6. The combination of a winding, a commutator comprising two ranges of segments connected thereto, pairs of brushes, each pair bearing on both of the said ranges, and a condenser connecting the brushes of a pair.

7. The combination of a winding, a commutator comprising two ranges of segments connected thereto, pairs of brushes, each pair bearing on both of said ranges, and a condenser connecting the brushes of a pair, said condenser being of such capacity that it will readily pass the working current but will act as a bar for the passage of current tending to flow in the coils of said winding which have their circuits locally closed by said brushes.

8. The combination of the secondary winding of a repulsion-motor, a commutator connected thereto, brushes bearing thereon, and a condenser included in the circuits of those coils of said winding which have their circuits locally closed by said brushes.

9. The combination of the secondary winding of a repulsion-motor, a commutator connected thereto, brushes bearing thereon, and a condenser included in the circuits of those coils of said winding which have their circuits locally closed by said brushes, said condenser acting as a bar to the passage of currents in the local circuits of said coils but permitting the working current to pass freely.

10. The combination of the secondary winding of a repulsion-motor, a commutator comprising two ranges of segments, the segments of each range being connected to alternate leads from said winding and each range being composed of alternate live and dead segments, pairs of brushes, each pair bearing upon both ranges of segments, and each brush being of such dimensions that it will not connect live segments, a current-limiting means connecting the brushes of a pair, and an external circuit connecting the pairs of brushes, the relations of said brushes and commutator-segments being such that continuous connection between said winding and said external circuit is maintained.

11. The combination of the secondary winding of a repulsion-motor, a commutator comprising two ranges of segments, the segments of each range being connected to alternate leads from said winding and each range being composed of alternate live and dead segments, pairs of brushes, each pair bearing on both ranges of segments and each brush being of such dimensions that it will not connect live segments, a condenser connecting the brushes of a pair, and an external circuit connecting the pairs of brushes, the relations of said brushes and commutator-segments being such that continuous connections between said winding and said external circuit is maintained.

12. The combination of the secondary winding of a repulsion-motor, a commutator comprising two ranges of segments, the segments of each range being connected to alternate leads from said winding and each range being composed of alternate live and dead segments, pairs of brushes, each pair bearing on both ranges of segments and each brush being of such dimensions that it will not connect live segments, a condenser and phase-correcting device connecting the brushes of a pair, and an external circuit connecting the pairs of brushes, the relation of said brushes and commutator-segments being such that continuous connection between said winding and said external circuit is maintained.

13. The combination of the secondary winding of a repulsion-motor, a commutator comprising two ranges of segments, the segments of each range being connected to alternate leads in said winding and each range being composed of alternate live and dead segments, pairs of brushes, each pair bearing on both ranges of segments and each brush being of such dimension that it will not connect live segments, a condenser connecting the brushes of a pair, and an external circuit connecting the pairs of brushes, the relation of said brushes and commutator-segments being such that continuous connections between said winding and said external circuit is maintained and the said condensers being of such capacity that they will readily pass the working current but will act as a bar to the passage of current tending to flow in the coils of said winding which have their circuits locally closed by said brushes.

In witness whereof I have hereunto set my hand this 14th day of September, 1903.

ELIHU THOMSON.

Witnesses:
 DUGALD McK. McKILLOP,
 JOHN J. WALKER.